United States Patent
Oono et al.

(10) Patent No.: US 6,384,513 B1
(45) Date of Patent: May 7, 2002

(54) ULTRASONIC MOTOR AND METHOD OF MANUFACTURING THE MOTOR

(75) Inventors: Takashi Oono; Takayuki Satodate, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/381,761
(22) PCT Filed: Jan. 29, 1999
(86) PCT No.: PCT/JP99/00370
  § 371 Date: Jan. 19, 2000
  § 102(e) Date: Jan. 19, 2000
(87) PCT Pub. No.: WO99/39429
  PCT Pub. Date: Aug. 5, 1999

(30) Foreign Application Priority Data

Jan. 29, 1998 (JP) .............................. 10/16702

(51) Int. Cl.[7] .............................................. H02N 2/00
(52) U.S. Cl. .............................. 310/323.05; 310/323.04
(58) Field of Search ....................... 310/323.04, 323.05, 310/323.08, 316.02

(56) References Cited

U.S. PATENT DOCUMENTS

| | | | |
|---|---|---|---|
| 5,079,470 A | * | 1/1992 | Kasuga et al. ......... 310/323.06 |
| 5,521,455 A | * | 5/1996 | Miyazawa et al. ........... 310/323 |
| 5,592,041 A | * | 1/1997 | Kasuga et al. ............... 310/316 |
| 5,619,089 A | * | 4/1997 | Suzuki et al. ................ 310/323 |
| 5,770,912 A | * | 6/1998 | Suzuki et al. ................ 310/316 |
| 5,780,955 A | * | 7/1998 | Iino et al. .................... 310/316 |
| 6,104,124 A | * | 8/2000 | Suzuki et al. ............. 310/323.4 |

* cited by examiner

*Primary Examiner*—Nestor Ramirez
*Assistant Examiner*—Peter Medley
(74) *Attorney, Agent, or Firm*—Adams & Wilks

(57) ABSTRACT

The conductor pattern on an ultrasonic motor lead board is prevented from being stripped off an ultrasonic motor lead board main body. An ultrasonic motor support member 124 for an ultrasonic motor 130 is firmly fixed on an ultrasonic motor shaft 132. A piezoelectric element 802 is firmly fixed to an ultrasonic stator main body 122*b*. The ultrasonic stator 122 is firmly fixed on the ultrasonic motor shaft 132. An ultrasonic motor lead board 136 is firmly fixed onto a backside of the ultrasonic motor support member 124. A conductor pattern 136*b* at its tip portion 136*e* and a conductor pattern 136*b* at its tip portion 136*f* are respectively welded to electrodes 803*a*, 803*b* of the piezoelectric element 802. An ultrasonic rotor 134 is arranged rotatable relative to the ultrasonic motor shaft 132. A pressurizing spring 138 puts the ultrasonic rotor 134 in pressure contact with the ultrasonic stator 122.

23 Claims, 12 Drawing Sheets

– 1 –

ULTRASONIC MOTOR AND METHOD OF MANUFACTURING THE MOTOR

TECHNICAL FIELD

The present invention relates to an ultrasonic motor which is structured for applying an electric signal to an electrode provided on polarized piezoelectric elements to thereby cause a vibration wave on an ultrasonic stator fixed with the piezoelectric element, so that an ultrasonic rotor is driven while in pressure contact with the ultrasonic stator. More particularly, the invention is concerned with a structure of an ultrasonic motor lead board provided for applying an electric signal to piezoelectric elements of the ultrasonic motor.

Also, the invention relates to a method for manufacturing an ultrasonic motor including an ultrasonic motor lead board provided for applying an electric signal to piezoelectric elements.

BACKGROUND ART

Referring to FIG. 11 and FIG. 12, an ultrasonic motor of the related art includes an ultrasonic motor 910 provided with an ultrasonic stator 922, an ultrasonic motor support member 924, an ultrasonic motor shaft 932, an ultrasonic rotor 934 and an ultrasonic motor lead board 940.

The ultrasonic motor support member 924 has a through-hole 924a fixed with the ultrasonic motor shaft 932 by passing the ultrasonic motor shaft 932 through the through-hole 924a. The ultrasonic stator 922 has a center hole 922a, an ultrasonic stator main body 922b and projections (comb teeth) 922c for displacement magnification. The displacement-magnifying projections (comb teeth) 922c are provided in a surface of the ultrasonic stator main body 922b. A polarized piezoelectric element 950 is fixed on an underside of the ultrasonic stator main body 922b. The ultrasonic stator 922 is passed at its center hole 922a over the ultrasonic motor shaft 932 and firmly fixed to the ultrasonic motor shaft 932. The ultrasonic stator 922 is firmly fixed on the ultrasonic motor shaft 932 such that the center hole 922a has an end face at an outer peripheral portion thereof that is contacted with the ultrasonic motor shaft 932.

The ultrasonic motor lead board 940 is provided to apply an electric signal to an electrode provided on the piezoelectric element 950. The ultrasonic motor lead board 940 is arranged between the ultrasonic stator main body 922b and the ultrasonic motor support member 924. The ultrasonic motor lead board 940 is neither fixed to the ultrasonic stator main body 922b nor the ultrasonic motor support member 924. The ultrasonic motor lead board 940 has conductor patterns 940a, 940b having tips respectively soldered (respectively shown at 952a, 952b) to electrodes 950a, 950b of the piezoelectric element 950.

The ultrasonic rotor 934 includes an ultrasonic rotor lower member 934a, an ultrasonic rotor upper member 934b, a rotation member 934c, a set screw 934d and a spring contact member 934e. The ultrasonic rotor 934 is provided rotatable relative to the ultrasonic motor shaft 932 such that the lower member 934a at its underside contacts top surfaces of projections 922c of the ultrasonic stator 922.

A pressurizing spring 960 contacts with a summit of the spring contact member 934e. The elastic force of the pressurizing spring 960 puts the ultrasonic rotor 934 in pressure contact with the ultrasonic stator 922.

An ultrasonic motor drive circuit (not shown) generates an electric signal to drive the ultrasonic motor 910. The electric signal is input to the piezoelectric element 950 by way of the conductor patterns 940a and 940b on the ultrasonic motor lead board 940. Based on the electric signal, oscillation waves are produced on the ultrasonic stator 922 fixed with the piezoelectric element 950. Due to the oscillation wave, the ultrasonic rotor 934 rotates which is contacted in a pressurized state with the ultrasonic stator 922.

In the related art ultrasonic motor, however, the ultrasonic motor lead board is arranged between the ultrasonic stator and the ultrasonic motor support member but secured neither to the ultrasonic stator nor the ultrasonic motor support member. Meanwhile, a vertical gap exists between the ultrasonic motor lead board and the ultrasonic stator. Also, there is a vertical gap between the ultrasonic motor lead board and the ultrasonic motor support member.

As a consequence, the ultrasonic motor lead board might freely move in the vertical direction between the ultrasonic stator and the ultrasonic motor support member. As a result, there has been a concern that the conductor patterns on the ultrasonic motor lead board may be stripped off the ultrasonic motor lead board main body thus resulting in the occurrence of electric disconnection.

Furthermore, in the related art ultrasonic motor the ultrasonic stator has been secured onto the ultrasonic motor shaft in a state wherein the conductor patterns on the ultrasonic motor lead board are connected to the ultrasonic stator. Consequently, there has been difficulty in firmly fixing the ultrasonic stator to the ultrasonic motor shaft. Meanwhile, there has been a concern that in the fixing process the conductor patterns on the ultrasonic motor lead board may be stripped off the ultrasonic motor lead board main body thus resulting in the occurrence of electric disconnection.

It is therefore an object of the present invention to provide, in order to solve the above problems, an ultrasonic motor which is free from the concern that the conductor patterns on an ultrasonic motor lead board may be stripped off the ultrasonic motor lead board main body, and a method for manufacturing such an ultrasonic motor.

It is another object of the invention to provide an ultrasonic motor which is easy to assemble and manufacture.

DISCLOSURE OF INVENTION

In order to solve the above problems, the present invention is structured such that, in an ultrasonic motor having a structure in which an electric signal is applied to an electrode provided on a polarized piezoelectric element to cause a vibration wave on an ultrasonic stator fixed with the piezoelectric element, and an ultrasonic rotor is driven that contacts in a pressurized state with the ultrasonic stator, a combination is provided comprising: an ultrasonic motor shaft for supporting an ultrasonic stator and an ultrasonic motor support member; an ultrasonic motor support member firmly fixed on the ultrasonic motor shaft; an ultrasonic stator fixed with a piezoelectric element having an electrode and being polarization treated, and fixed on the ultrasonic motor shaft; an ultrasonic motor lead board having a conductor pattern firmly fixed to the ultrasonic motor support member; an ultrasonic rotor rotatably provided on the ultrasonic motor shaft and contacted with the ultrasonic stator; a pressurizing spring for pressurizing the ultrasonic stator and the ultrasonic rotor; wherein the conductor pattern of the ultrasonic motor lead board is electrically connected to the electrode of the piezoelectric element.

This structure can eliminate the concern that the conductor pattern of the ultrasonic motor lead board may be stripped off an ultrasonic motor lead board main body, or reduce this concern.

Also, it is preferred that the ultrasonic motor support member has a first through-hole to pass through the ultrasonic motor shaft and a second through-hole to pass through the conductor pattern of the ultrasonic motor lead board, the ultrasonic motor support member being firmly fixed on the ultrasonic motor shaft in such a state that the ultrasonic motor shaft is passed through the first through-hole of the ultrasonic motor support member, and the conductor pattern of the ultrasonic motor lead board, in a state passing through the second through-hole, being firmly fixed to the electrode of the piezoelectric element in the ultrasonic motor of the present invention.

Also, it is preferred that the ultrasonic stator has a cylindrical portion (122d) having a center hole, and that the ultrasonic stator is firmly fixed on the ultrasonic motor shaft in such a state that the cylindrical portion at one end face contacts the ultrasonic motor support member in the ultrasonic motor of the present invention.

Also, it is preferred that the ultrasonic motor lead board is firmly fixed to one surface of the ultrasonic motor support member, and that the ultrasonic stator is firmly fixed to the ultrasonic motor shaft in such a manner as to be contacted with the other surface of the ultrasonic motor support member in the ultrasonic motor of the present invention.

This structure can eliminate the concern that the conductor pattern of the ultrasonic motor lead board may be stripped off an ultrasonic motor lead board main body, or can reduce this concern.

Also, the ultrasonic motor of the invention is easy to assemble and manufacture.

Furthermore, in an ultrasonic motor manufacturing method for manufacturing an ultrasonic motor that is structured to apply an electric signal to an electrode provided on a polarized piezoelectric element to cause a vibration wave on an ultrasonic stator fixed with the piezoelectric element, and an ultrasonic rotor is driven that contacts in a pressurized state with the ultrasonic stator, the present invention is provided such that the ultrasonic motor has an ultrasonic motor support member with a first through-hole to pass through an ultrasonic motor shaft and a second through-hole to pass through a conductor pattern of an ultrasonic motor lead board. Next, the ultrasonic motor support member is firmly fixed on the ultrasonic motor shaft in a state such that the ultrasonic motor shaft is passed through the first through-hole of the ultrasonic motor support member. Next, the ultrasonic stator (122) is firmly fixed on the ultrasonic motor shaft (132). Next, the ultrasonic motor lead board having the conductor pattern is firmly fixed to the ultrasonic motor support member. Next, the conductor pattern of the ultrasonic motor lead board is firmly fixed to the electrode of the piezoelectric element such that the conductor pattern of the ultrasonic motor lead board is passed through the second through-hole. Next, an ultrasonic rotor is arranged rotatable relative to the ultrasonic motor shaft and is contacted with the ultrasonic stator. Next, the ultrasonic stator and the ultrasonic rotor are put in pressure contact.

This structure can eliminate the concern that the conductor pattern of the ultrasonic motor lead board may be stripped off an ultrasonic motor lead board main body, or may reduce this concern.

Also, the use of the ultrasonic motor manufacturing method of the present invention makes an ultrasonic motor easy to assemble and manufacture.

Furthermore, in an ultrasonic motor manufacturing method for manufacturing an ultrasonic motor that is structured to apply an electric signal to an electrode provided on a polarized piezoelectric element to cause a vibration wave on an ultrasonic stator fixed with the piezoelectric element, and an ultrasonic rotor is driven that contacts in a pressurized state with the ultrasonic stator, the present invention is provided such than an ultrasonic motor support member is provided with a first through-hole to pass through an ultrasonic motor shaft and a second through-hole to pass through a conductor pattern of an ultrasonic motor lead board. Next, the ultrasonic motor lead board having the conductor pattern is firmly fixed to the ultrasonic motor support member. Next, the ultrasonic motor support member is firmly fixed on the ultrasonic motor shaft such that the ultrasonic motor shaft is passed through the first through-hole of the ultrasonic motor support member. Next, the ultrasonic stator is firmly fixed on the ultrasonic motor shaft. Next, the conductor pattern of the ultrasonic motor lead board is firmly fixed to the electrode of the piezoelectric element such that the conductor pattern of the ultrasonic motor lead board firmly fixed to the ultrasonic motor support member is passed through the second through-hole. Next, an ultrasonic rotor is arranged rotatable relative to the ultrasonic motor shaft and contacted with the ultrasonic stator. Next, a pressurizing spring is arranged such that the ultrasonic stator and the ultrasonic rotor are put in pressure contact.

This structure can reduce the concern that the conductor pattern of the ultrasonic motor lead board may be stripped off an ultrasonic motor lead board main body.

Also, the use of the ultrasonic motor manufacturing method of the present invention makes an ultrasonic motor easy to assemble and manufacture.

BEST MODE FOR CARRYING OUT THE INVENTION

An embodiment of an ultrasonic motor of the present invention will be explained below based on the drawings.

(1) Ultrasonic Motor of the Invention

Figure 1:
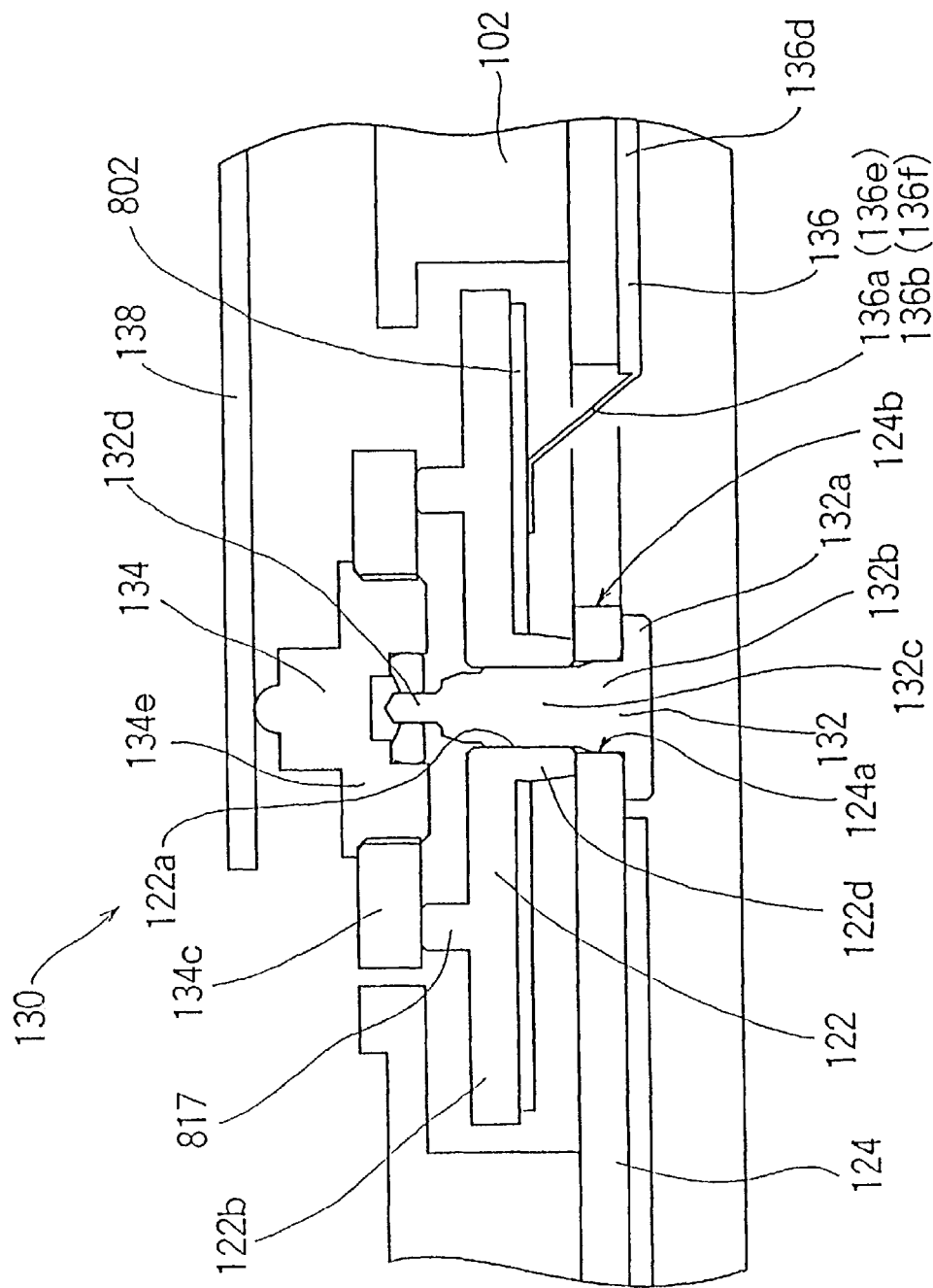
FIG. 1 is a schematic sectional view showing an embodiment of an ultrasonic motor of the invention.
Figure 2:
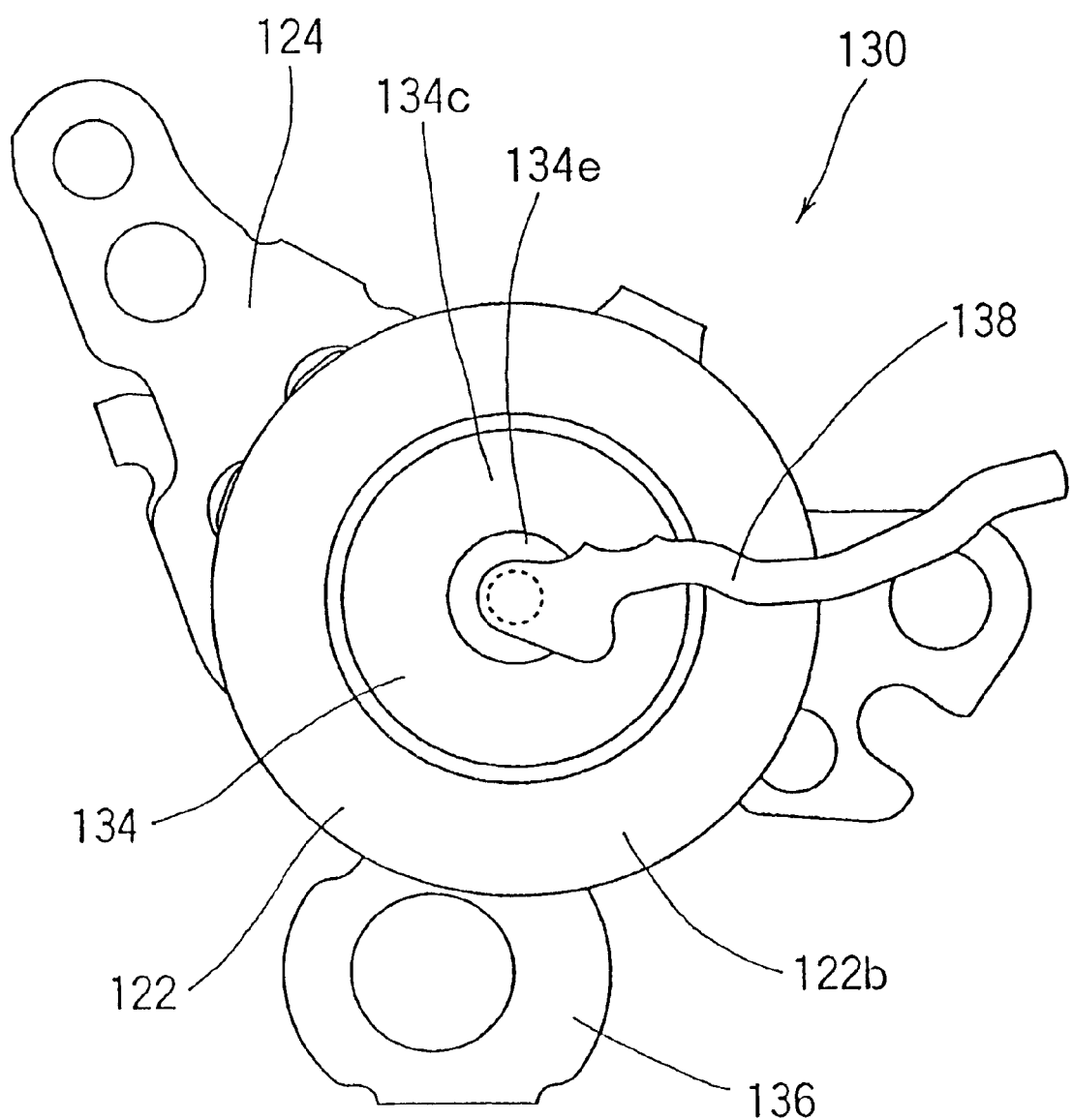
FIG. 2 is a plan view showing a shape of the embodiment of an ultrasonic motor of the invention as viewed from the front side.
Figure 3:
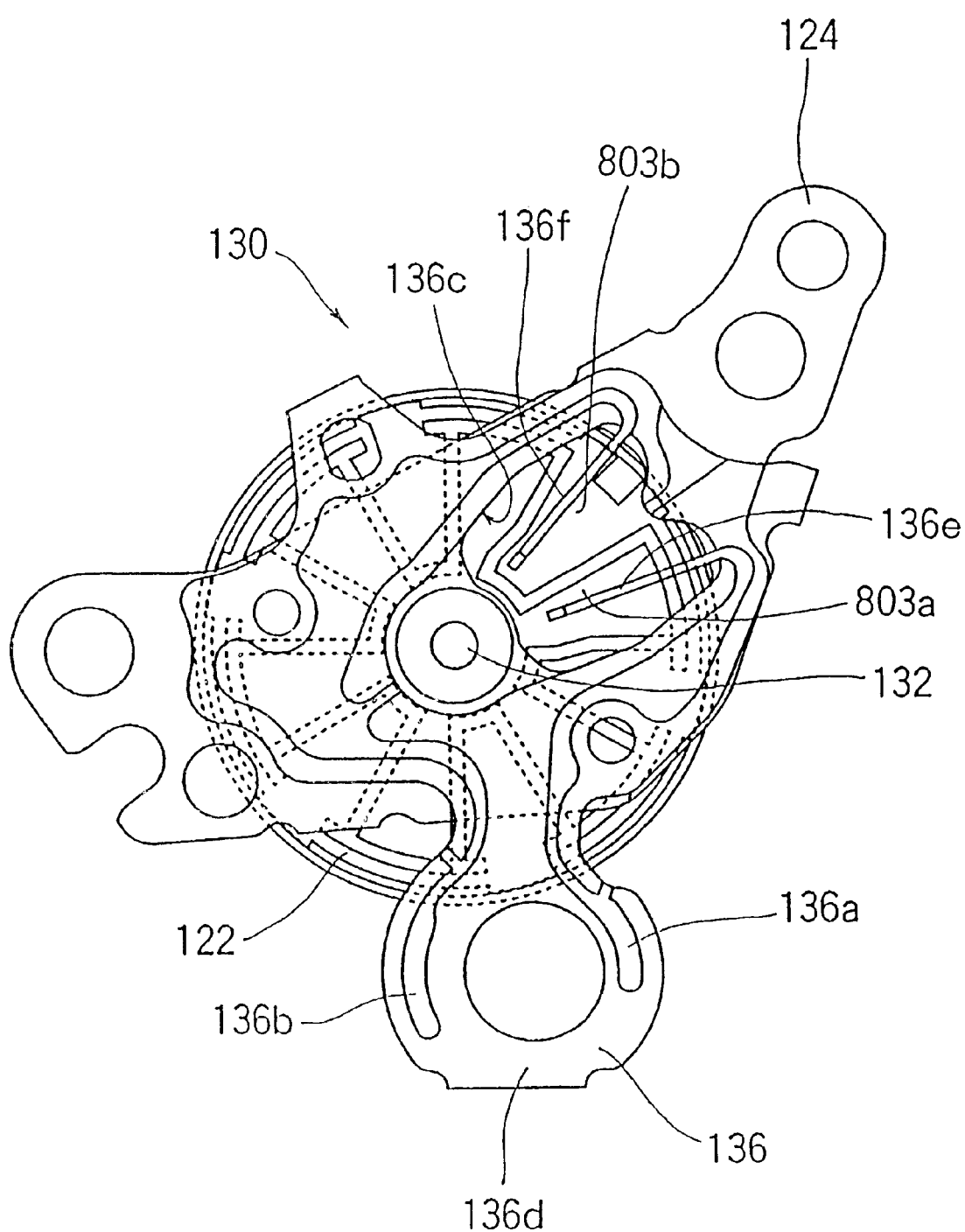
FIG. 3 is a plan view showing a shape of the embodiment of an ultrasonic motor of the invention as viewed from the back side.

Referring to FIG. 1 to FIG. 3, an ultrasonic motor 130 of the invention comprises an ultrasonic stator 122, an ultrasonic motor support member 124, an ultrasonic motor shaft 132, an ultrasonic rotor 134 and an ultrasonic motor lead board 136. The ultrasonic motor shaft 132 includes a flanged portion 132a, a first shaft portion 132b, a second shaft portion 132c and a tip shaft portion 132d.

The ultrasonic motor support member 124 has a first through-hole 124a for passing through the ultrasonic motor shaft 132 and a second through a-hole 124b for passing through conductor pattern for the ultrasonic motor lead board 136. The ultrasonic motor support member 124 is fixed on the first shaft portion 132b of the ultrasonic motor shaft 132 with this first through-hole 124a passed through by the ultrasonic motor shaft 132. The ultrasonic motor support member 124 abuts at an underside of the ultrasonic motor support member 124 against the flanged portion 132a of the ultrasonic motor shaft 132.

The ultrasonic stator 122 has a center hole 122a, an ultrasonic stator main body 122b, projections (comb teeth) 817 for displacement magnification and a cylindrical portion 122d. The projections 817 are provided on a surface of the ultrasonic stator main body 122b. The cylindrical portion 122d projects from a backside of the ultrasonic stator main body 122b, and the center hole 122a is formed in a manner penetrating through the cylindrical portion 122d.

A polarized piezoelectric element 802 is fixed to an underside of the ultrasonic stator main body 122b. The ultrasonic stator 122 at its center hole 122a is passed over the ultrasonic motor shaft 132 and secured to the second shaft portion 132c of the ultrasonic motor shaft 132. The ultrasonic stator 122 is secured to the ultrasonic motor shaft 132 in a state such that the center hole 122a at an outer peripheral portion thereof, i.e. an end face of the cylindrical portion 122d, contacts with a top surface of the ultrasonic motor support member 124.

Figure 4:
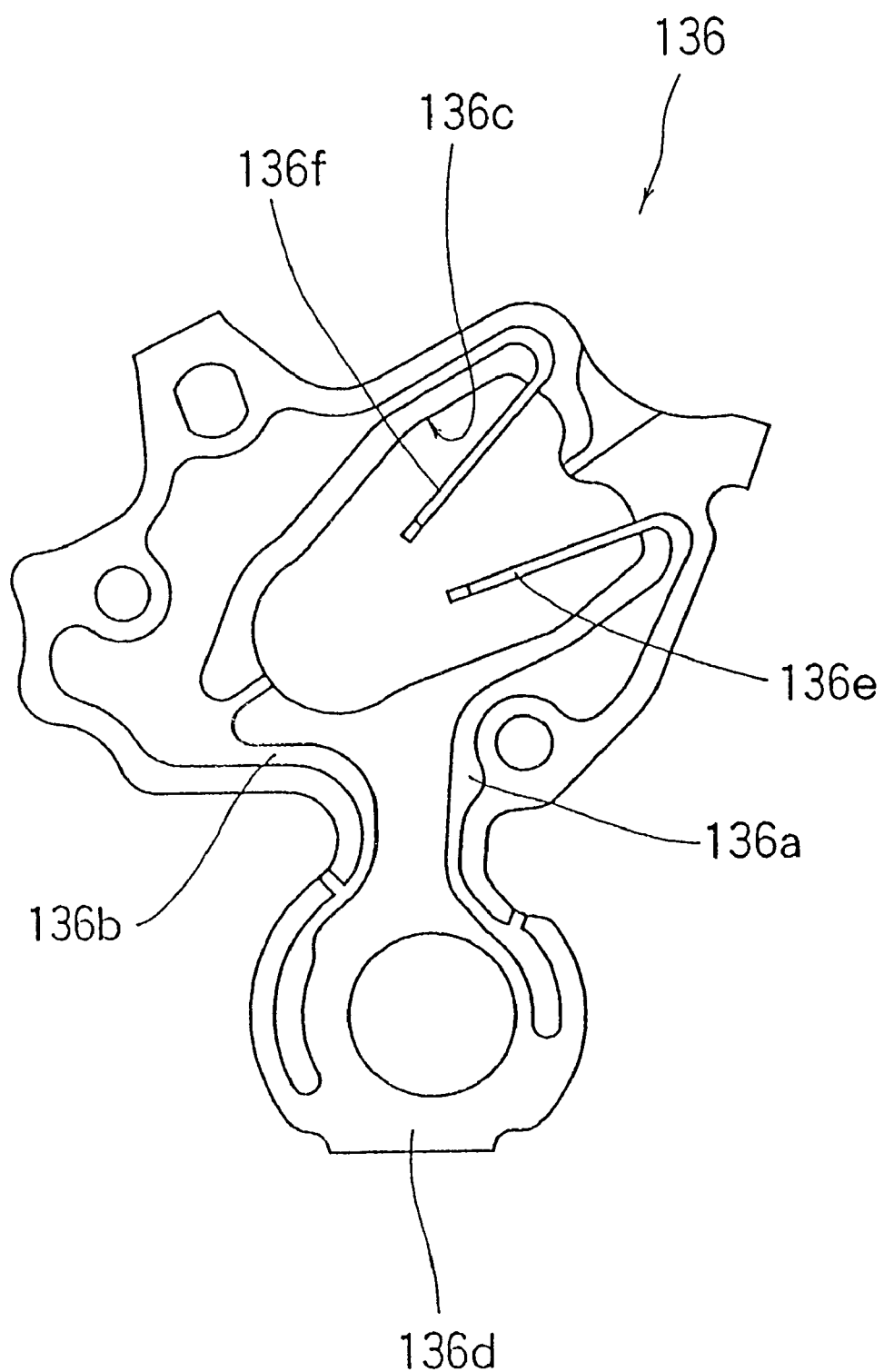
FIG. 4 is a plan view showing an ultrasonic motor lead board used for the ultrasonic motor of the invention.

Referring to FIG. 4, the ultrasonic motor lead board 136 is provided to an apply electric signal to an electrode provided on the piezoelectric element 802. The ultrasonic motor lead substrate 136 has a board main body 136d formed of an insulation material such as polyimide, and conductor patterns 136a and 136b fixed on the board main body 136d. An opening 136c is provided through the board main body 136d so that the conductor pattern 136a at its tip portion 136e and the conductor pattern 136b at its tip portion 136f are positioned in the opening 136c.

Referring again to FIG. 1 to FIG. 3, the ultrasonic motor lead board 136 at a surface having no conductor patterns 136a and 136b of the board main body 136d is fixed by adhesion on the backside of the ultrasonic motor support member 124. It is preferred that fixing of the ultrasonic motor lead board 136 to the ultrasonic motor support member 124 be conducted after fixing the ultrasonic stator 122 onto the ultrasonic motor shaft 132.

This process can eliminate or extremely lessen the concern that the conductor patterns 136a and 136b of the ultrasonic motor lead board 136 may be stripped off the board main body 136d of the ultrasonic motor lead 136.

Next, the tip portion 136e of the conductor pattern 136a and the tip portion 136f of the conductor pattern 136b on the ultrasonic motor lead board 136 are respectively welded to electrodes 803a, 803b of the piezoelectric element 802. As a modification, the tip portion 136e of the conductor pattern 136a and the tip portion 136f of the conductor pattern 136b may be respectively soldered to the electrodes 803a, 803b of the piezoelectric element 802.

The ultrasonic rotor 134 includes a rotary member 134c and a spring contact member 134e. The ultrasonic rotor 134 is rotatably arranged on the ultrasonic motor shaft 132 such that the rotary member 134c at its underside contacts with top surfaces of the projections 817 on the ultrasonic stator 122.

A pressurizing spring 138 contacts with a top of the spring contact member 134e. By the elastic force of the pressurizing spring 138, the ultrasonic rotor 134 is put in pressure contact with the ultrasonic stator 122.

An ultrasonic motor drive circuit (not shown) generates an electric signal to drive the ultrasonic motor 130. The electric signal is input to the piezoelectric element 802 through the conductor patterns 136a and 136b of the ultrasonic motor lead board 136. Based on the electric signal, vibration waves are produced on the ultrasonic stator 122 fixed with the piezoelectric element 802. The vibration waves cause the ultrasonic rotor 134 to rotate which is contacted in pressurized state with the ultrasonic stator 122.

As a modification, first the ultrasonic motor lead substrate 136 may be adhered to the backside of the ultrasonic motor support member 124, next the ultrasonic motor support member 124 may be fixed on the ultrasonic motor shaft 132, and next the ultrasonic stator 122 may be fixed on the ultrasonic motor shaft 132. Next, the tip portion 136e of the conductor pattern 136a and the tip portion 136f of the conductor pattern 136b of the ultrasonic motor lead board 136 are respectively welded to the electrodes 803a, 803b of the piezoelectric elements 802.

This process can lessen the concern that the conductor patterns may 136a and 136b on the ultrasonic motor lead board 136 be stripped off the board main body 136d of the ultrasonic motor lead 136.

In the case that the ultrasonic motor 130 of the present invention is employed in an analog electronic timepiece, the ultrasonic motor support member 124 is fixed on a main plate 102. In this case, the pressurizing spring 138 is preferably formed as a part of a date indicator maintaining plate.

The ultrasonic motor 130 of the invention constructed as above is easy to assemble and manufacture.

(2) Electronic Timepiece Using Ultrasonic Motor of the Invention

An electronic timepiece will be explained which employs the ultrasonic motor 130 of the invention.

Figure 5:
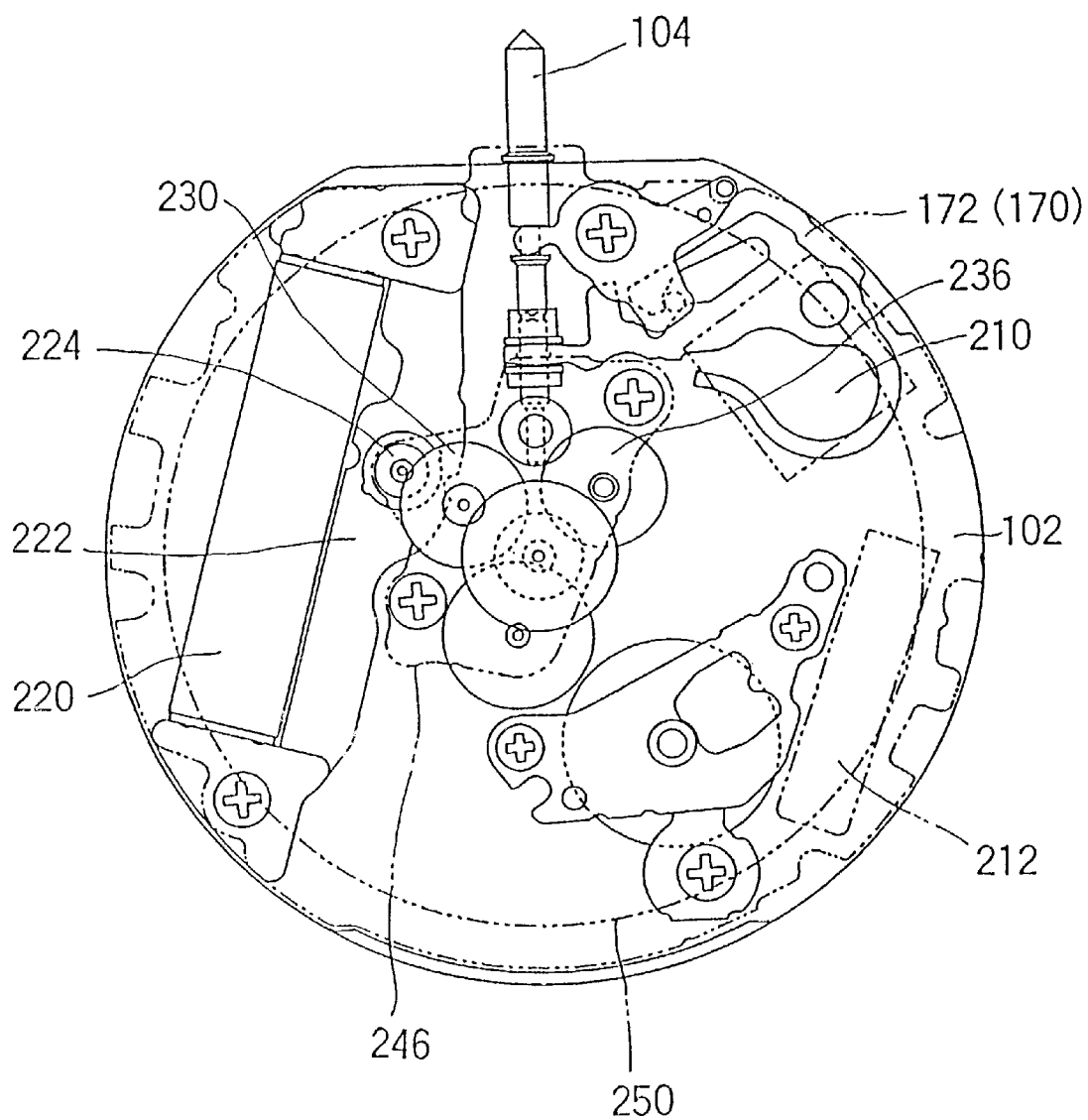
FIG. 5 is a schematic plan view of an analog electronic timepiece using the ultrasonic motor of the invention, showing a shape thereof as viewed from the front side with parts partly omitted.
Figure 6:
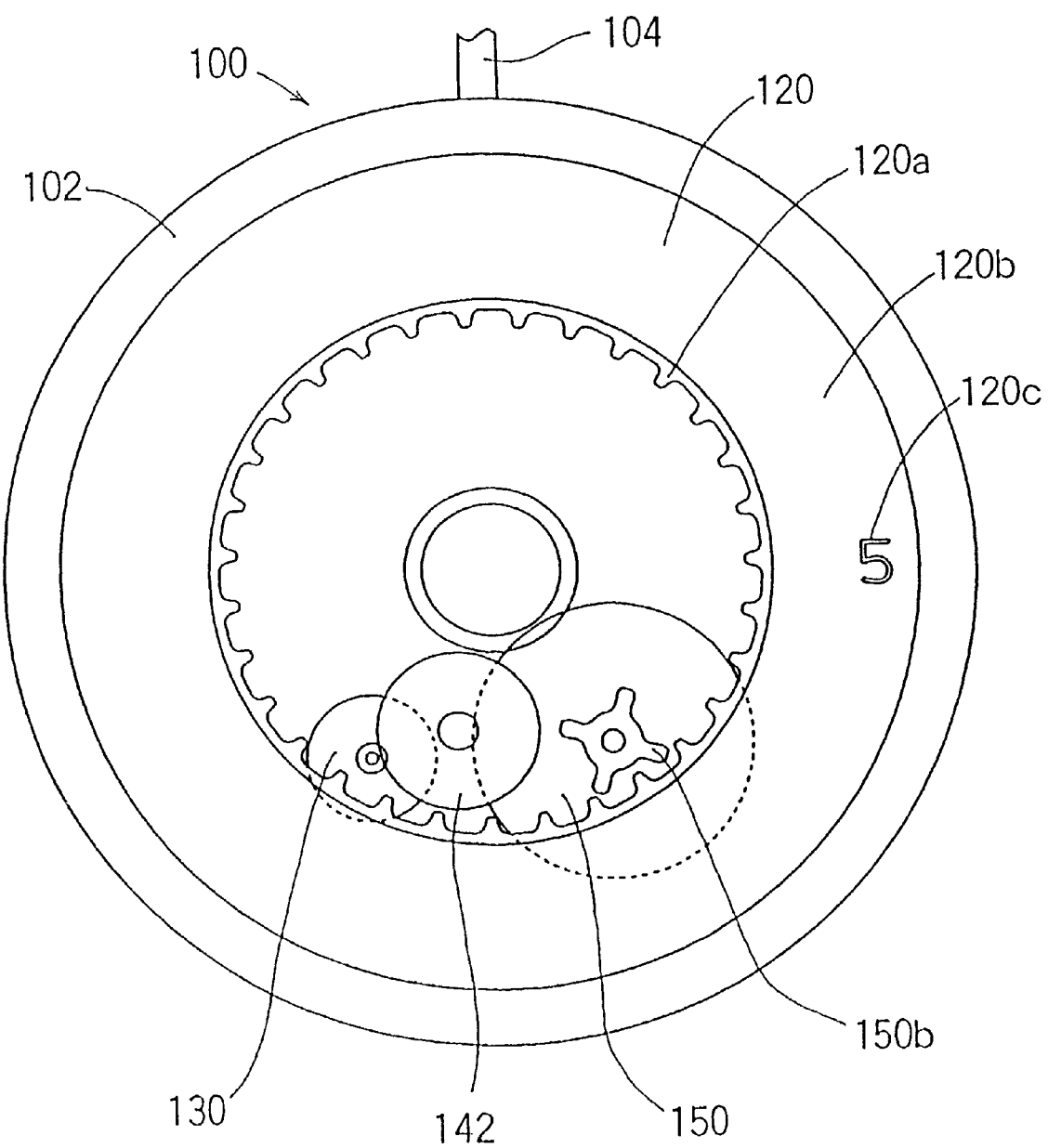
FIG. 6 is a schematic plan view of the analog electronic timepiece using the ultrasonic motor of the invention, showing a shape thereof as viewed from the back side with parts partly omitted.

Referring to FIG. 5 and FIG. 6, the electronic timepiece has a movement (mechanical body including a drive section) 100, using the ultrasonic motor 130 of the invention, which is structured by an analog electronic timepiece and has a main plate 102 having a circuit board for the movement. A winding stem 104 is rotatably built in a winding stem guide hole in the main plate 102. A dial (not shown) is mounted on the movement 100. A change-over device (not shown) is provided on the main plate 102, which is operated due to operation of the winding stem 104.

Of the respective sides of the main plate 102, the side having the dial is referred to as a "back side" of the movement 100, while the side opposite to the side having the dial is referred to as a "main surface side" of the movement 100. A wheel train arranged on the "main surface side" of the movement 100 is referred to as a "main surface wheel train", while a wheel train arranged on the "back side" of the movement 100 is referred to as a "back side wheel train".

The switch-over device may be arranged on the "main surface side" of the movement 100, or on the "back side" of the movement 100. Indicator wheels, such as a date indicator and a week indicator, are arranged on the "back side" of the movement 100.

A date indicator 120 is rotatably arranged on the main plate 102. The date indicator 120 includes a date indicator gear portion 120a and a date character printing portion 120b. Only "5" is shown as one example of date characters 120c in FIG. 6. The date indicator gear portion 120a includes 31 date gears.

The ultrasonic motor 130 for rotating the date indicator 120 is arranged on the main plate 102. The use of the ultrasonic motor 130 enables the date indicator 120 to positively rotate through a smaller of reduction wheel train.

An intermediate date indicator driving wheel 142 is provided to rotate based on rotation of the ultrasonic rotor 134 of the ultrasonic motor 130. A date indicator driving wheel 150 is provided to rotate based on rotation of the intermediate date indicator driving wheel 142. The date indicator driving wheel 150 has four date feed gear portions 150b. It is structured such that due to rotation of the date indicator driving wheel 150 the date feed gear portions 150b cause the date indicator 120 to rotate.

The indicator wheel to be rotated by the ultrasonic motor 130 may be a date indicator, week indicator, or other kind of a wheel indicative of information about time or calendar, e.g. an hour wheel, month wheel, year wheel or age of the moon indicator wheel.

On the main surface side of the movement 100, a circuit block 172 is arranged. This circuit block 172 has a circuit board 170, an integrated circuit 210 and a quartz oscillator 212.

The movement 100 has a coil block 220, a stator 222 and a rotor 224. A fifth wheel 230 is arranged to rotate based on rotation of the rotor 224. A fourth wheel 232 is provided to rotate based on rotation of the fifth wheel 230. A second hand 234 indicative of "second" is attached to the fourth wheel 232. A third wheel 236 is arranged to rotate based on rotation of the fourth wheel 232. A cannon pinion with driving wheel 240 is provided to rotate based on rotation of the third wheel 236. A minute hand 242 indicative of "minute" is mounted on the cannon pinion with driving wheel 240. A battery 250 is arranged over the circuit block 172 and train wheel bridge 246.

Now explanation will be made on the operation of the analog electronic timepiece using the ultrasonic motor of the invention.

Figure 7:
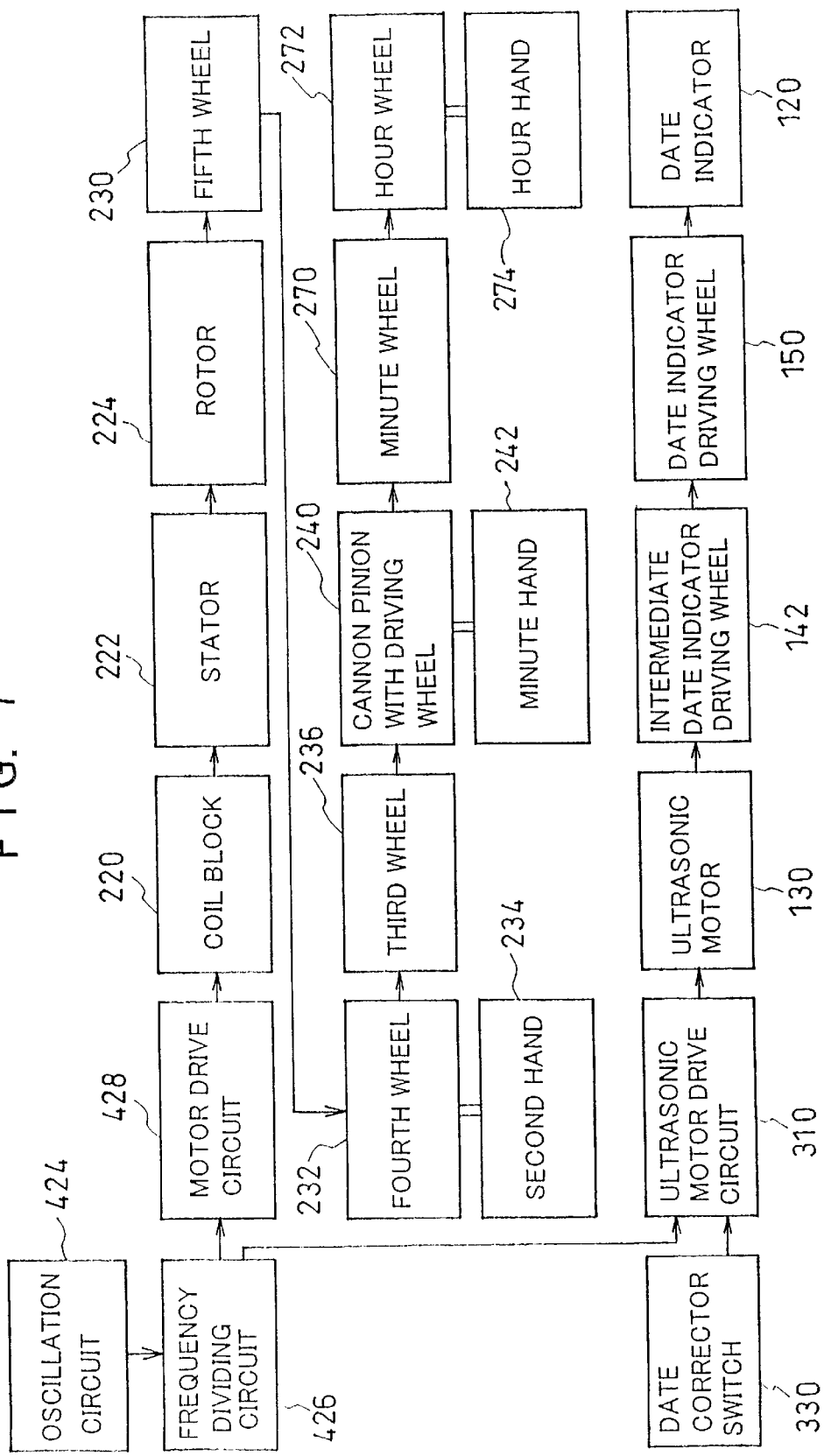
FIG. 7 is a block diagram showing a structure of the analog electronic timepiece using the ultrasonic motor of the invention.

Referring to FIG. 7, an oscillation circuit 424 outputs a reference signal. The oscillation circuit 424 includes a quartz oscillator 212 constituting an oscillation source. The quartz oscillator 212 oscillates, for example, at 32,768 Hz. Based on oscillation of this quartz oscillator 212, a frequency dividing circuit 426 frequency-divides an output signal of the oscillation circuit 424. A motor drive circuit 428 outputs a motor drive signal based on the output signal of the frequency dividing circuit 426 for, driving a stepper motor. The oscillation circuit 424, the frequency dividing circuit 426 and the motor drive circuit 428 are incorporated in an integrated circuit 210.

If a coil block 220 inputs a motor drive signal, a stator 222 is magnetized to cause the rotor 224 to rotate. The rotor 224 rotates, for example, 180 degrees per second. Based on rotation of the rotor 224, a fourth wheel 232 rotates through rotation of a fifth wheel 230. The fourth wheel 232 is structured to rotate once per minute. A second hand 234 rotates in unison with the fourth wheel 232.

A third wheel 236 rotates based on rotation of the fourth wheel 232. A cannon pinion with driving wheel 240 rotates based on rotation of the third wheel 236. The minute hand 242 rotates in unison with the cannon pinion with driving wheel 240. A slip mechanism (not shown) is provided on the cannon pinion with driving wheel 240. The minute hand 242 and hour hand 274 can be rotated by rotating a winding stem 104 in a state that the second hand 234 is stopped upon aligning hands through the slip mechanism. The cannon pinion with driving wheel 240 rotates once per hour.

A minute wheel 270 rotates based on rotation of the cannon pinion with driving wheel 240. An hour wheel 272 rotates based on rotation of the minute wheel 270. The hour wheel 272 rotates once per 12 hours. An hour hand 274 is mounted on the hour wheel 272. The hour hand 274 rotates in unison with the hour wheel 272.

An ultrasonic motor drive circuit 310 outputs an ultrasonic motor drive signal to drive the ultrasonic motor 130 based on an output signal of the frequency dividing circuit 426. The ultrasonic motor drive circuit 310 is incorporated in the integrated circuit 210.

An intermediate date indicator driving wheel 142 rotates based on rotation of the ultrasonic rotor 134 of the ultrasonic motor 130. A date indicator driving wheel 150 rotates based on rotation of the intermediate date indicator driving wheel 142. The rotation of the date indicator driving wheel 150 causes the date feed gear portion 150b to rotate the date indicator 120. The ultrasonic motor drive circuit 310 outputs a signal to rotate the date indicator 120 by one tooth per day.

By operating a date corrector switch 330 the date indicator 120 is structurally rotatable. If the date corrector switch 330 is operated, the ultrasonic motor drive circuit 310 outputs an ultrasonic motor drive signal to drive the ultrasonic motor 130. With this structure, it is possible to change the indication of the date indicator 120. The date corrector switch 330 may be structured to operate by operating the winding stem 104, or buttons or the like may be provided to operate the date corrector switch 330.

(3) Operation of the Ultrasonic Motor

Now explanation will be made on the ultrasonic motor of the present invention.

Figure 8:
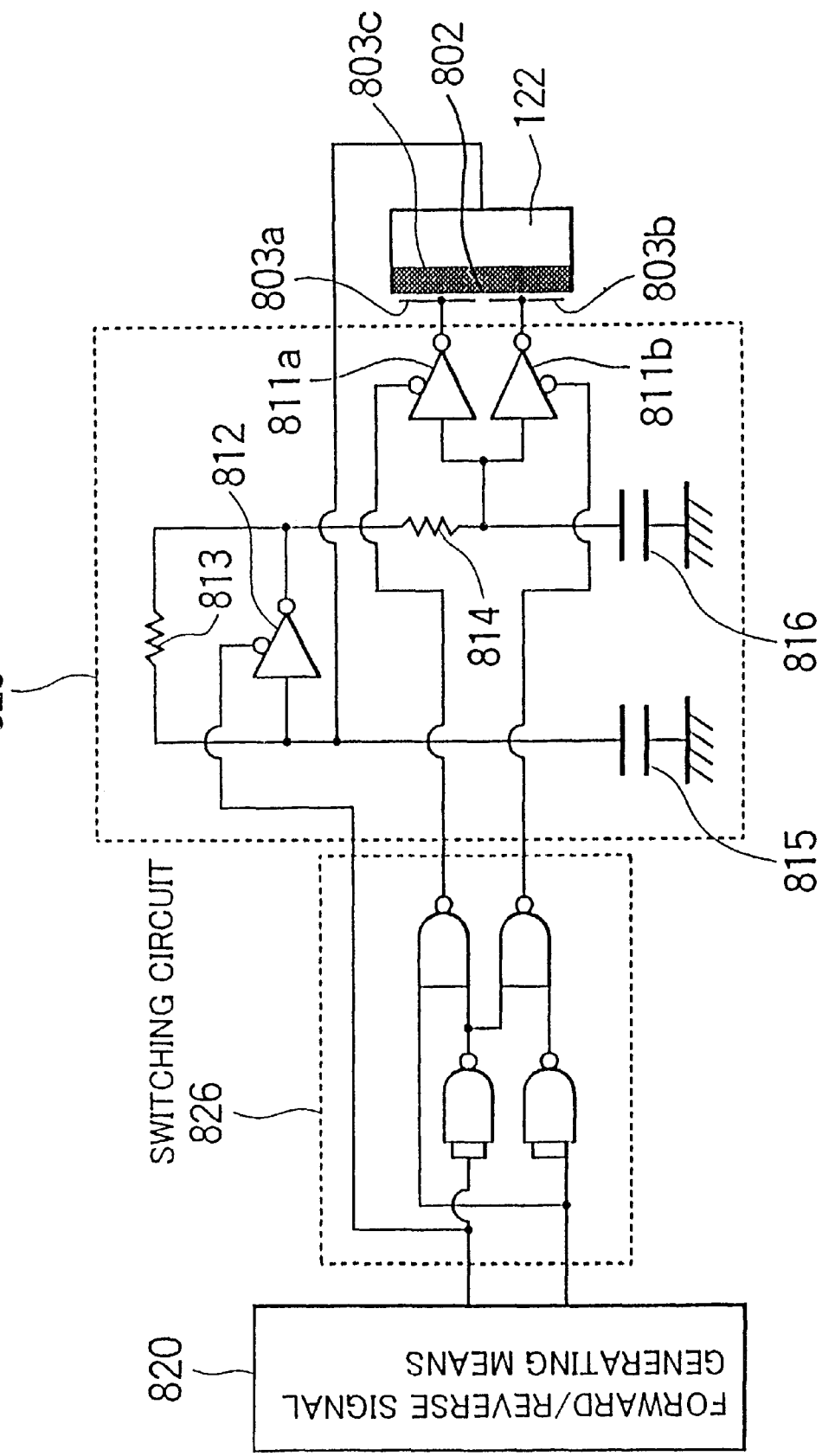
FIG. 8 is a block diagram showing a structure of a drive circuit to the ultrasonic motor of the invention.

Referring to FIG. 8, a piezoelectric element 802 is adhered on one surface of the ultrasonic stator 122 forming a vibrator for the ultrasonic motor 130, which has two sets of electrode groups 803a, 803b formed by a plurality of electrodes. An oscillation drive circuit 825 is connected to the electrode groups 803a, 803b of the piezoelectric element 802. An inverter 812 serves as an inversion power amplifier to invert and amplify an electric signal as an oscillation information given from one surface formed with the electrode groups 803a, 803b of the piezoelectric element 802 and the electrode 803c or ultrasonic stator 122 formed on the other surface. A resistor 813 is connected in parallel with the inverter 812 to stabilize an operation point for the inverter 812.

The inverter 812 has an output terminal connected to an input terminal of two sets of buffers 811a, 811b through a resistor 814. The two buffers 811a, 811b have output terminals respectively connected to electrode groups 803a, 803b of the piezoelectric element 802. A capacitor 815 has one end connected to an input terminal of the inverter 812, and a capacitor 816 has one end connected to an output terminal of the inverter 812 through a resistor 814. The capacitors 815, 816 have the other ends grounded to adjust the phase inside the oscillation drive circuit 825.

The inverter 812 and the buffers 811a, 811b respectively have input and output terminals as well as a control terminal and are of a tri-state structure that can assume a high impedance state at the output terminal depending on a signal input to the control terminal.

A forward/reverse signal generating means 820 outputs to a switching circuit 826 a forward/reverse signal to set a rotation direction of the rotor 134 of the ultrasonic motor. The switching circuit 826 has output terminals respectively connected to control terminals of the tri-state buffers 811a, 811b and the tri-state inverter 812 of an oscillation drive circuit 825, and causes one of the tri-state buffers 811a, 811b to function as a buffer and the other buffer at its output terminal to be placed in a high impedance state being disabled based on an output signal of the forward/reverse signal generating circuit 820.

The oscillation drive circuit 825, forward/reverse signal generating circuit 820 and switching circuit 826 are included in the ultrasonic motor drive circuit 310.

The ultrasonic stator 122 is driven by a tri-state buffer that is selected by an output signal of the switching circuit 826 to function as a buffer. The ultrasonic stator 122 is driven only by a tri-state buffer that is allowed to function as a usual buffer by the switching circuit 826. If the tri-state buffer permitted to function as a usual buffer by the switching circuit 826 is changed, the ultrasonic rotor 134 of the ultrasonic motor 130 is inverted in rotational direction.

By an output signal of the switching circuit 826 that is output based on an output of the forward/reverse signal generating means 820, the tri-state inverter 812 at its output terminal may be placed in a high impedance state. When the tri-state inverter 812 is disabled in this manner, both the tri-state buffers 811a, 811b are disabled to stop the rotation of the rotor 134 of the ultrasonic motor.

Figure 9:
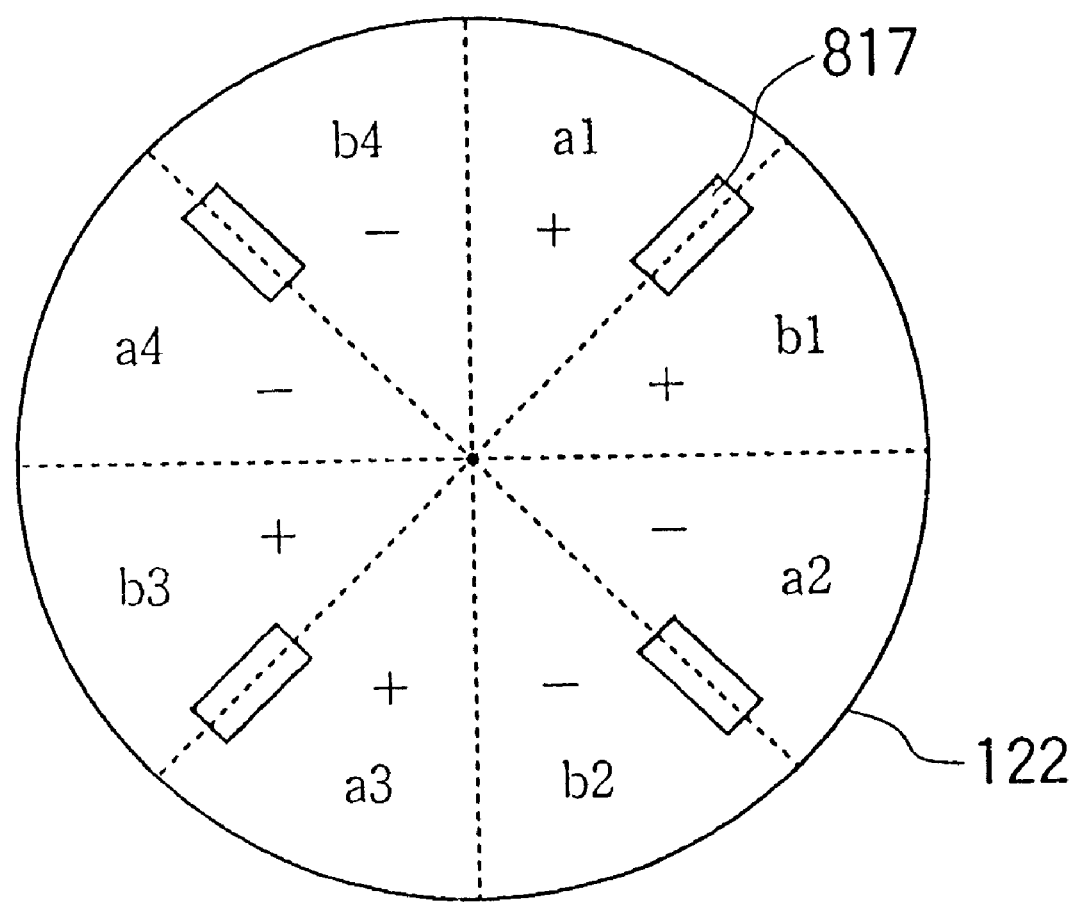
FIG. 9 is a plan view of an ultrasonic stator of the ultrasonic motor of the invention.
Figure 10:
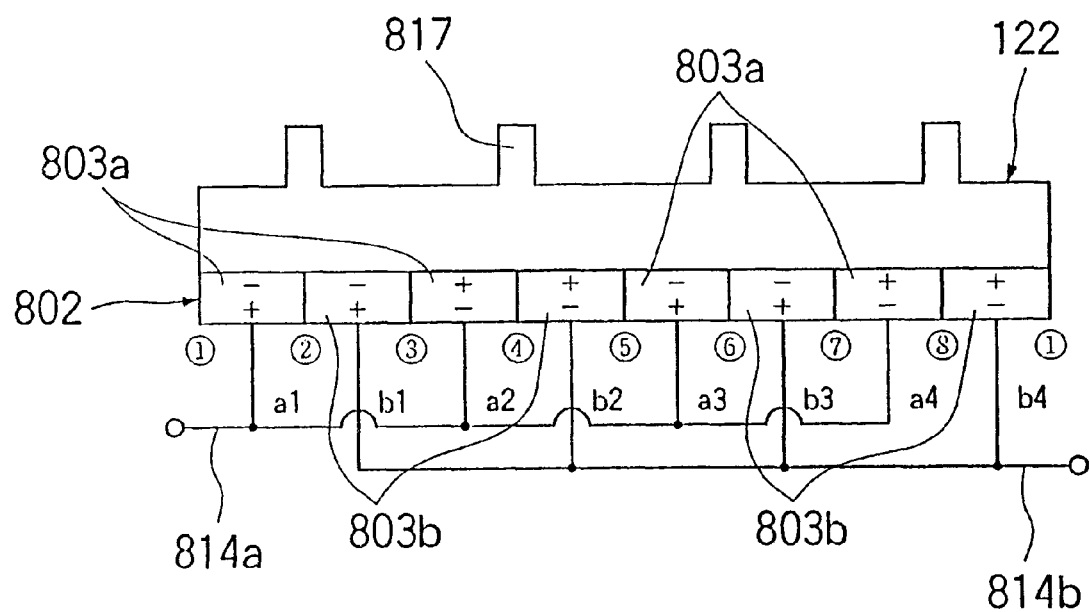
FIG. 10 is a sectional view of an ultrasonic stator of the ultrasonic motor of the invention.
Figure 11:
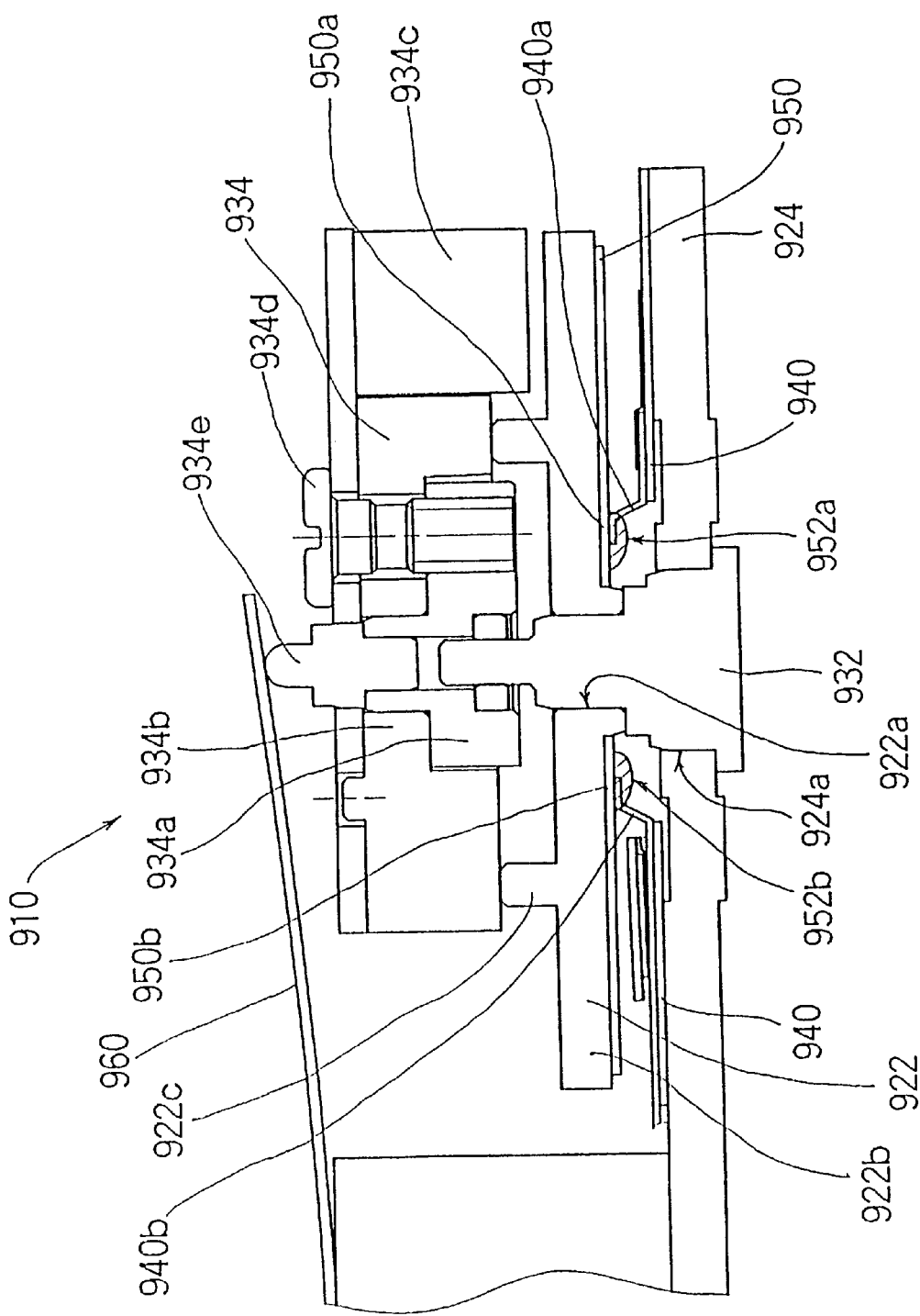
FIG. 11 is a schematic sectional view of a related art ultrasonic motor.
Figure 12:
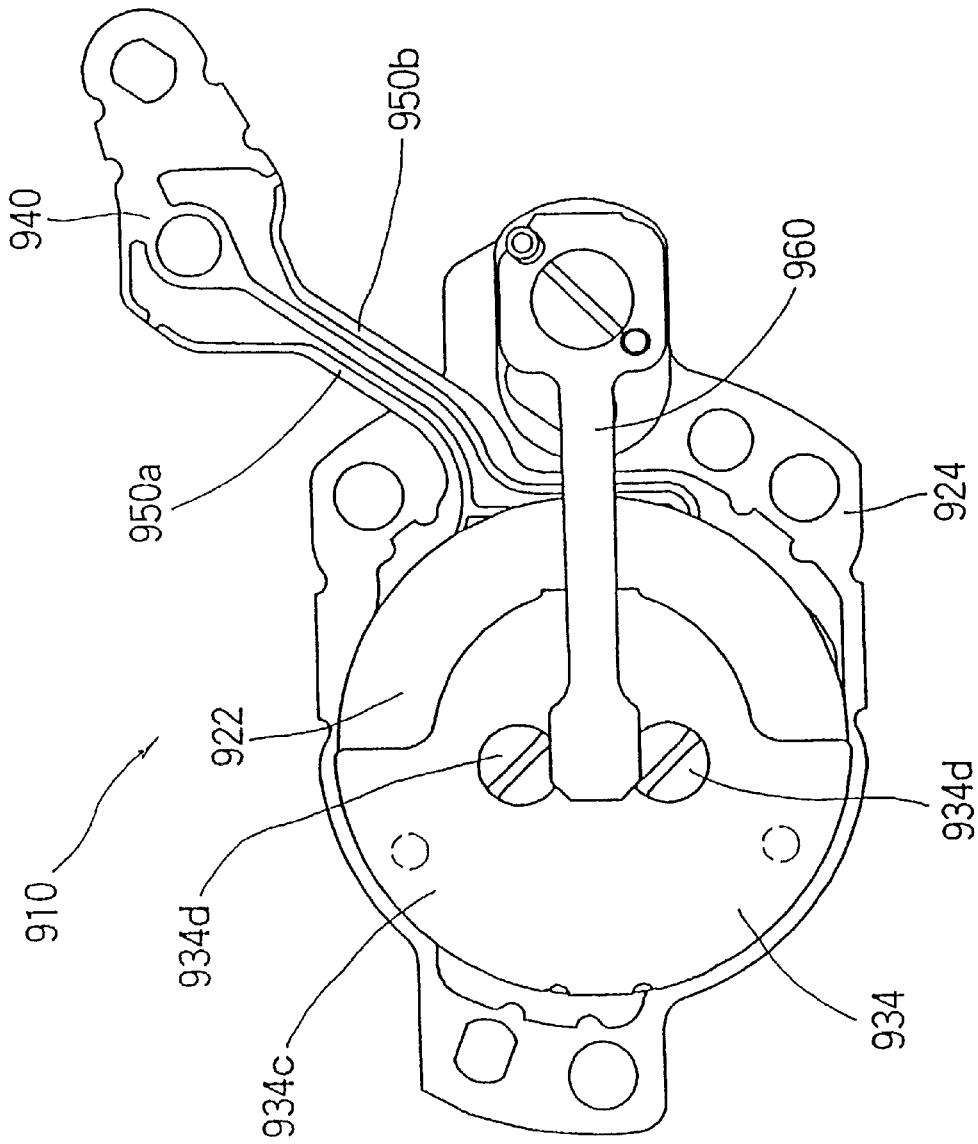
FIG. 12 is a plan view showing a shape of the related art ultrasonic motor as viewed from the front side.

Referring to FIG. 9 and FIG. 10, the ultrasonic stator 122 in a disc form is joined at a flat surface with a disc shaped piezoelectric element 802 by adhesion, thin-film forming method or the like. A two-wavelength standing wave is oscillated in a circumferential direction of the ultrasonic stator 122, driving to rotate the ultrasonic rotor. The piezoelectric element 802 at one flat face is formed with 8-divided electrodes, that is circumferentially four times the wavelength, every other one, thereby having a first electrode group 803a and a second electrode group 803b. Polarization (+) and (−) is provided as shown in FIG. 9 and FIG. 10.

The first electrode group 803a is structured by electrodes a1, a2, a3 and a4, each electrode of which is shorted through a first connection means 814a. The second electrode group 803b is structured by electrodes b1, b2, b3 and b4, each electrode of which is shorted through a second connection means 814b.

In the figure, (+) and (−) represent directions of polarization, which are respectively polarized by applying positive and negative electric fields to a joining surface side of the piezoelectric element 802 to the ultrasonic stator 122.

Projections (comb teeth) 817 are provided on the surface of the ultrasonic stator 122 at every other one of electrode boundaries to magnify the displacement of the ultrasonic stator 122 and transmit a drive force from the ultrasonic stator 122 to the ultrasonic rotor 134.

A high frequency voltage generated by the oscillation drive circuit 825 is applied to either one of the electrode group 803a or 803b to cause a 2-wavelength standing wave in a circumferential direction of the ultrasonic stator 122 thereby driving to rotate the ultrasonic rotor. The rotational direction of the ultrasonic rotor 134 for the ultrasonic motor 130 can be switched depending on which electrode group drives the ultrasonic stator 122.

It is preferred that the ultrasonic motor 130 of the present invention is driven by the structure including the ultrasonic motor drive circuit 310 as above, the piezoelectric element 802 and the ultrasonic stator 122. Alternatively, it is possible to drive the ultrasonic motor 130 by other structures.

The ultrasonic motor drive circuit 310 outputs an ultrasonic motor drive signal to the ultrasonic motor 130 if outputting a count result of 0 o'clock a.m. That is, the ultrasonic motor drive circuit 310 is structured to output an ultrasonic motor drive signal to the ultrasonic motor 130, to rotate the date indicator 120 by 360°/31 once a day, or 1/31 rotation.

The ultrasonic motor drive circuit 310 counts "year", "month", "day" and hour. If the ultrasonic motor drive circuit 310 outputs a count result of 0 o'clock a.m. of the usual day, an ultrasonic motor drive signal corresponding to the usual day is output to the ultrasonic motor 130. That is, the ultrasonic motor drive circuit 310 is structured to output to the ultrasonic motor 130 an ultrasonic motor drive signal to rotate by 360°/31 the date indicator 120 once a day, i.e. by a, 1/31 rotation.

Incidentally, the analog electronic timepiece using the ultrasonic motor of the invention may be provided with a calendar indicator wheel to indicate other information about calendar, e.g. "year", "month", "days of the week", "roku-yo"[Buddhist 6-day rotation calendar markings] or the like.

As explained above, the ultrasonic motor 130 of the invention has an ultrasonic stator 122 joined with a piezoelectric element 802 and an ultrasonic rotor 134 to be frictionally driven by vibration waves caused on the ultrasonic stator 122 due to expansion and contraction of the piezoelectric element to which an ultrasonic motor drive signal is inputted.

The piezoelectric element 802 has at least two sets of electrode groups formed by a plurality of electrodes on the surface thereof. The ultrasonic motor drive circuit 310 has at least two power amplifiers. These power amplifiers have output terminals respectively connected to the two sets of electrode groups of the piezoelectric element, individually driving each electrode.

INDUSTRIAL APPLICABILITY

The present invention, as explained above, is structured as discussed above in an ultrasonic motor, providing the following effects.

(1) there is no fear that the conductor pattern on the ultrasonic motor lead board can be stripped off the ultrasonic motor lead board main body during the ultrasonic motor manufacture process and in a completed ultrasonic motor.

(2) The ultrasonic motor is easy to assemble and manufacture.

What is claimed is:

1. In an ultrasonic motor having an electrode provided on a polarized piezoelectric element for producing a vibration wave on an ultrasonic stator fixed to the piezoelectric element in response to a signal applied to the electrode, and having an ultrasonic rotor in pressurized contact with the ultrasonic stator so that the rotor is driven in response to the vibration wave, the combination comprising:

an ultrasonic motor shaft for supporting the ultrasonic stator;

an ultrasonic motor support member firmly fixed on the ultrasonic motor shaft;

the ultrasonic stator fixed with the piezoelectric element having the electrode thereon and being fixed on the ultrasonic motor shaft;

an ultrasonic motor lead board having a conductor pattern and being firmly fixed to the ultrasonic motor support member;

the ultrasonic rotor rotatably provided on the ultrasonic motor shaft in contact with the ultrasonic stator; and a pressurizing spring for urging the ultrasonic stator and the ultrasonic rotor in contact with each other;

wherein the conductor pattern of the ultrasonic motor lead board is electrically connected to the electrode of the piezoelectric element;

wherein the ultrasonic motor support member has a first through-hole to pass therethrough the ultrasonic motor shaft and a second through-hole to pass therethrough a lead of the conductor pattern of the ultrasonic motor lead board;

wherein the ultrasonic motor support member is firmly fixed to the ultrasonic motor shaft such that the ultrasonic motor shaft is passed through the first through-hole of the ultrasonic motor support member; and wherein the lead of the conductor pattern of the ultrasonic motor lead board passes through the second through-hole and is fixed to the electrode of the piezoelectric element.

2. An ultrasonic motor according to claim 1; wherein the ultrasonic stator has a cylindrical portion surrounding the ultrasonic motor shaft and defining a center hole through which the ultrasonic motor shaft passes, and the ultrasonic stator is firmly fixed to the ultrasonic motor shaft such that one end of the cylindrical portion is in contact with the ultrasonic motor support member.

3. An ultrasonic motor according to claim 1; wherein the ultrasonic motor lead board is firmly fixed to a first surface of the ultrasonic motor support member, and the ultrasonic stator is firmly fixed to the ultrasonic motor shaft and opposes a second surface of the ultrasonic motor support member opposite the first surface.

4. An ultrasonic motor according to claim 1; wherein the ultrasonic motor lead board is firmly fixed to a first surface of the ultrasonic motor support member, and the ultrasonic stator is firmly fixed to the ultrasonic motor shaft and is in contact with a second surface of the ultrasonic motor support member opposite the first surface.

5. An ultrasonic motor according to claim 1; wherein the shaft has a cylindrical shape and has a flange formed at one end thereof.

6. An ultrasonic motor according to claim 5; wherein the ultrasonic motor support member has a through-hole formed therein through which the shaft passes, and the ultrasonic motor support member is supported by the flange.

7. An ultrasonic motor according to claim 6; wherein the ultrasonic motor lead board is fixedly adhered to the ultrasonic motor support member.

8. An ultrasonic motor according to claim 6; wherein the ultrasonic motor lead board is fixedly adhered to a first surface of the ultrasonic motor support member and the ultrasonic stator opposes a second surface of the ultrasonic motor support member opposite the first surface.

9. An ultrasonic motor according to claim 8; wherein the ultrasonic stator has a plurality of projections extending from a surface thereof opposite the ultrasonic motor support member, and the ultrasonic rotor is supported by the projections.

10. An ultrasonic motor according to claim 9; wherein the ultrasonic stator has a flat portion from which the projections extend, and a cylindrical portion surrounding the shaft, and the cylindrical portion of the ultrasonic stator is in contact with the ultrasonic motor support member.

11. In an ultrasonic motor manufacturing method for manufacturing an ultrasonic motor having an electrode provided on a polarized piezoelectric element for producing a vibration wave on an ultrasonic stator fixed to the piezoelectric element in response to a signal applied to the electrode, and having an ultrasonic rotor in pressurized contact with the ultrasonic stator so that the rotor is driven in response to the vibration wave, the ultrasonic motor manufacturing method including the combination of steps comprising:

providing in an ultrasonic motor support member a first through-hole and passing therethrough an ultrasonic motor shaft and providing in the ultrasonic motor support member a second through-hole and passing therethrough a lead of a conductor pattern of an ultrasonic motor lead board;

firmly fixing the ultrasonic motor support member to the ultrasonic motor shaft such that the ultrasonic motor shaft is passed through the first through-hole of the ultrasonic motor support member;

firmly fixing the ultrasonic stator to the ultrasonic motor shaft so that the piezoelectric element opposes a first surface of the support member;

firmly fixing the ultrasonic motor lead board having the conductor pattern (136*a*, 136*b*) to a second surface of the ultrasonic motor support member opposite the first surface;

firmly fixing a lead of the conductor pattern of the ultrasonic motor lead board to the electrode of the piezoelectric element such that the lead of the conductor pattern of the ultrasonic motor lead board is passed through the second through-hole;

arranging an ultrasonic rotor rotatable relative to the ultrasonic motor shaft and in contact with the ultrasonic stator; and arranging a pressurizing spring such that the ultrasonic stator and the ultrasonic rotor are put in pressure contact with each other.

12. In an ultrasonic motor manufacturing method for manufacturing an ultrasonic motor having an electrode provided on a polarized piezoelectric element for producing a vibration wave on an ultrasonic stator fixed to the piezoelectric element in response to a signal applied to the electrode, and having an ultrasonic rotor in pressurized contact with the ultrasonic stator so that the rotor is driven in response to the vibration wave, the ultrasonic motor manufacturing method including the combination of steps comprising:

providing in an ultrasonic motor support member a first through-hole and passing therethrough an ultrasonic motor shaft and providing in the ultrasonic motor support member a second through-hole and passing therethrough a lead of a conductor pattern of an ultrasonic motor lead board;

firmly fixing the ultrasonic motor lead board having the conductor pattern to the ultrasonic motor support member;

firmly fixing the ultrasonic motor support member to the ultrasonic motor shaft such that the ultrasonic motor shaft is passed through the first through-hole of the ultrasonic motor support member;

firmly fixing the ultrasonic stator to the ultrasonic motor shaft so that the piezoelectric element opposes a first surface of the support member;

firmly fixing the conductor pattern of the ultrasonic motor lead board to the electrode of the piezoelectric element such that the lead of the conductor pattern of the ultrasonic motor lead board firmly fixed to the ultrasonic motor support member is passed through the second through-hole;

arranging an ultrasonic rotor rotatable relative to the ultrasonic motor shaft and in contact with the ultrasonic stator (122); and arranging a pressurizing spring such that the ultrasonic stator and the ultrasonic rotor are put in pressure contact with each other.

13. An ultrasonic motor comprising: a shaft; a support member fixed to the shaft; a stator fixed to the shaft; a piezoelectric element fixed to the stator for producing a vibrating wave in the stator in response to a signal; a rotor in contact with the stator for undergoing movement in response to the vibrating wave; and a lead board having a conductor pattern and a lead for supplying the signal to the piezoelectric element and being fixedly adhered to the support member; wherein the lead board is fixed to a first surface of the support member and the stator opposes a second surface of the support member opposite the first surface, and the piezoelectric element is disposed between the stator and the second surface of the support member so that the stator and the lead board are positioned on opposite surfaces of the support member.

14. An ultrasonic motor according to claim 13; wherein the support member has a through-hole formed therein and the lead of the lead board passes therethrough and is connected to the piezoelectric element.

15. An ultrasonic motor according to claim 13; wherein the stator has a plurality of projections extending from a surface thereof opposite a surface to which the piezoelectric element is fixed, and the rotor is supported by the projections.

16. An ultrasonic motor according to claim 13; further comprising a pressure applying member for urging the rotor against the stator.

17. An ultrasonic motor according to claim 13; wherein each of the rotor, the stator and the support member have a through-hole through which the shaft passes.

18. An ultrasonic motor according to claim 13; wherein the support member has a through-hole through which the shaft passes, and the shaft has a flange for supporting the support member.

19. An ultrasonic motor according to claim 18; wherein the stator has a flat portion having a through-hole through which the shaft passes, and a cylindrical portion extending from the flat portion and surrounding the shaft, one end of the cylindrical portion being disposed against a first surface of the support member.

20. An ultrasonic motor according to claim 13; wherein the piezoelectric element has at least two sets of electrode groups comprising plural electrodes formed on a surface thereof.

21. An ultrasonic motor according to claim 20; further comprising an oscillation drive circuit having at least two power amplifiers each of which has an output terminal connected to one of the at least two sets of electrode groups of the piezoelectric element and which excites one of the electrode groups independently of the other, and an inverting amplifier having an input terminal and an output terminal, the input terminal being connected to an electrode formed on a surface opposite to a surface on which the at least two sets of electrode groups are formed, the output terminal being connected to input terminals of the at least two power amplifiers; forward/reverse signal generating means for producing a forward/reverse signal to set a rotational direction of the rotor; and a switching circuit for selecting at least one of the at least two power amplifiers of the oscillation drive circuit on the basis of the forward/reverse signal output by the forward/reverse signal generating means.

22. An ultrasonic motor according to claim 20; wherein the oscillation drive circuit has a resonance circuit formed by a vibrating member consisting of the piezoelectric element and the stator and a capacitor and which utilizes an inductive property of the vibrating member in a mechanical resonance state.

23. An ultrasonic motor according to claim 13; wherein the electrodes are disposed on at least one surface of the piezoelectric element at nearly equal intervals in a multiple of four, respective two neighboring electrodes of the electrodes being paired and subjected to a polarization treatment so that a polarization direction of the electrodes is alternately reversed every pair; and wherein the ultrasonic motor further comprises first circuit means and second circuit means for electrically short-circuiting every other electrode to construct the two sets of electrode groups, and projections for transmitting motive power to the rotor, the projections being disposed at positions adjacent to every other boundary portions of the electrodes whose number is equal to a multiple of four and which are disposed at substantially regular intervals on at least one surface of the piezoelectric element bonded to the stator.

* * * * *